(12) United States Patent
deMarcellus

(10) Patent No.: US 6,345,831 B1
(45) Date of Patent: Feb. 12, 2002

(54) SELECTIVELY RELEASABLE ANTI-SWAY BAR

(76) Inventor: Edmond deMarcellus, 1596 Linville Falls Hwy., Linville Falls, NC (US) 28646

( * ) Notice: Subject to any disclaimer, the term of this patent is extended or adjusted under 35 U.S.C. 154(b) by 0 days.

(21) Appl. No.: 09/502,703

(22) Filed: Feb. 11, 2000

(51) Int. Cl.$^7$ ................................................. B60G 7/00
(52) U.S. Cl. ............................................... 280/124.106
(58) Field of Search .................. 280/124.103, 124.106, 280/124.13, 124.152, 124.166

(56) References Cited

U.S. PATENT DOCUMENTS

| | | | | |
|---|---|---|---|---|
| 2,209,259 A | * | 7/1940 | Christman | 280/124.166 |
| 4,405,148 A | * | 9/1983 | Dickerson | 280/124.106 |
| 4,648,620 A | * | 3/1987 | Nuss | |
| 5,118,070 A | * | 6/1992 | Reid | |
| 5,178,406 A | * | 1/1993 | Reynolds | 280/124.152 |
| 5,186,486 A | * | 2/1993 | Hynds et al. | 280/124.166 |
| 5,217,245 A | * | 6/1993 | Guy | |
| 5,368,326 A | * | 11/1994 | Turck et al. | 280/124.13 |
| 5,565,251 A | * | 10/1996 | Tang et al. | |
| 5,702,121 A | * | 12/1997 | Song | 280/124.166 |
| 5,934,696 A | * | 8/1999 | Bloser et al. | |
| 6,022,030 A | * | 2/2000 | Fehring | 280/124.106 |
| 6,076,840 A | * | 6/2000 | Kincaid et al. | |
| 6,179,310 B1 | * | 1/2001 | Clare et al. | 280/124.106 X |

FOREIGN PATENT DOCUMENTS

JP          825940     * 1/1996

OTHER PUBLICATIONS

Sway Bar E–mails from Web Site www.scruz.net which details design possibilities for disconnectable sway bar, Jun. 1997.*

Web Sitte www.jksmfg.com printout of JKS Manufacturing "Quick and Quicker Disconnects" Bulletins—details anti–sway bars which disconnect, unknown.*

Web Site www.4×4review.com printout titled "The 1999 SEMA Show and Automotive Aftermarket Industry Week Section Day 1"—discloses ADDCO Industries selectively releasable anti–sway bar, Nov. 1999.*

Web Site www.hotrodcafe.com printout of ADDCO Industries Bulletin—Details ADDCO Industries, unknown.*

Web Site www.car–truck.com printout of MEGA Buzz 2000 Brochure—Details ADDCO selectively releasable anti–sway bar, Nov. 1999.*

Web Site www.4×4u.com printout of SEMA 2000 Brochure—Details ADDCO selectively releasable anti–sway bar, unknown.*

* cited by examiner

Primary Examiner—Brian L. Johnson
Assistant Examiner—Bryan Fischmann
(74) Attorney, Agent, or Firm—MacCord Mason PLLC

(57) ABSTRACT

A selectively releasable anti-sway bar for a vehicle having a frame and at least one pair of opposed wheels attached to the frame by a spring-type suspension system. The apparatus includes a torsional bar assembly and control arm connectors is attached to the suspension system adjacent to each of the opposed wheels. A releasable scissors linkage is located between one end of the torsional bar assembly and one end of at least one of the control arm connectors. The scissors linkage includes a first arm rigidly connected to one end of the torsional bar assembly. A second arm is pivotally connected to the same end of the torsional bar assembly adjacent to the first arm and connected at the its other end to one end of at least one of the control arm connectors. In the preferred embodiment, a key-and-slot arrangement selectively rigidly connects the second arm to the first arm. Thus, the anti-sway bar may be selectively released by disengaging the scissors linkage and selectively engaged by engaging the scissors linkage. In the preferred embodiment, the key is biased towards the slot during engagement thereby self-tightening the scissors linkage to substantially reduce play and improve performance of the anti-sway bar.

55 Claims, 5 Drawing Sheets

SELECTIVELY RELEASABLE ANTI-SWAY BAR

BACKGROUND OF THE INVENTION

(1) Field of the Invention

The present invention relates generally to vehicle suspension systems and, more particularly, to a selectively releasable anti-sway bar for off-road vehicles.

(2) Description of the Prior Art

Anti-sway bars have long been known in the automotive industry as a means for improving the handling characteristics of vehicles and trailers. On an even surface, the anti-sway bar will act to maintain the two wheels that it connects at the same height and prevents the center of gravity of the vehicle from shifting. Such a shift in the center of gravity can result in a reduction of control of the vehicle. The stabilizing action of the anti-sway bar is most desirable for 'on-road'—i.e., regular level, paved highway—use.

When a vehicle is operated 'off-road,' however, in rough, unpaved terrain, the leveling effect produced by the anti-sway bar is not desired. For a better, more stable ride over such terrain, it is important that the wheels of a vehicle be able to move up and down over obstacles independently of each other. Many vehicles in use today—such as trucks, Jeeps, trailers, and sport utility vehicles—are designed for both on-road and off-road use. It is therefore desirable when operating such vehicles on-road to benefit from the stability that an anti-sway bar provides, but to eliminate that same effect when the vehicle is being operated in an off-road environment.

One approach of the prior art has been to completely remove the anti-sway bar altogether from such vehicles. This approach suffers from numerous disadvantages; removal is complicated, time-consuming, and degrades the on-road handling characteristics of the vehicle. An alternative solution offered by the prior art has been to leave the anti-sway bar installed while operating the vehicle off-road, but this does not allow the vehicle's suspension to travel fully.

Another approach has been to use a pin and telescoping arrangement for the control arm connectors, thereby disengaging the connection between the anti-sway bar and the vehicle suspension. However, after off-roading, especially on uneven ground or in dirt, mud or snow, it may be difficult to replace the pin. Also, the movement of the pin introduces undesirable play into the suspension system when the anti-sway bar is supposed to be engaged.

Thus, there remains a need for a selectively releasable anti-sway bar for a vehicle or a trailer which may be easily engaged and disengaged while, at the same time, does not introduce undesirable play into the suspension system while engaged.

SUMMARY OF THE INVENTION

The present invention is directed to a selectively releasable anti-sway bar for a vehicle or a trailer having a frame and at least one pair of opposed wheels attached to the frame by a spring-type suspension system. The apparatus includes a torsional bar assembly and control arm connectors that are attached to the suspension system adjacent to each of the opposed wheels. A releasable scissors linkage is located between one end of the torsional bar assembly and one end of at least one of the control arm connectors.

The scissors linkage includes a first arm rigidly connected to one end of the torsional bar assembly. A second arm is pivotally connected to the same end of the torsional bar assembly adjacent to the first arm and connected at its other end to one end of at least one of the control arm connectors. In the preferred embodiment, a key-and-slot arrangement selectively and rigidly connects the second arm to the first arm. A linear actuator is attached to the scissors linkage for selectively engaging and disengaging the key-and-slot arrangement to rigidly connect the second arm to the first arm of the scissors linkage. Thus, the anti-sway bar may be selectively released by disengaging the scissors linkage and selectively engaged by engaging the scissors linkage. In the preferred embodiment, the key is biased towards the slot during engagement, thereby self-tightening the scissors linkage to substantially reduce play and improve performance of the anti-sway bar.

Accordingly, one aspect of the present invention is to provide a selectively releasable anti-sway bar for a vehicle having a frame and at least one pair of opposed wheels attached to the frame by a spring-type suspension system. The apparatus includes: a torsional bar assembly; control arm connectors attached to the suspension system adjacent to each of the opposed wheels; and a releasable scissors linkage between one end of the torsional bar assembly and one end of at least one of the control arm connectors, whereby the anti-sway bar may be selectively released by disengaging the scissors linkage and selectively engaged by engaging the scissors linkage.

Another aspect of the present invention is to provide a selectively releasable scissors linkage for an anti-sway bar for a vehicle having a frame and at least one pair of opposed wheels attached to the frame by a spring-type suspension system, the anti-sway bar including a torsional bar assembly and control arm connectors attached to the suspension system adjacent to each of the opposed wheels. The apparatus includes: a first arm rigidly connected to one end of the torsional bar assembly; a second arm pivotally connected to the same end of the torsional bar assembly adjacent to the first arm and connected at the its other end to one end of at least one of the control arm connectors; and a key-and-slot arrangement for selectively rigidly connecting the second arm to the first arm, whereby the anti-sway bar may be selectively released by disengaging the scissors linkage and selectively engaged by the scissors linkage.

Still another aspect of the present invention is to provide a selectively releasable anti-sway bar for a vehicle having a frame and at least one pair of opposed wheels attached to the frame by a spring-type suspension system. The apparatus includes: a torsional bar assembly; control arm connectors attached to the suspension system adjacent to each of the opposed wheels; a releasable scissors linkage between one end of the torsional bar assembly and one end of at least one of the control arm connectors. The scissors linkage includes: a first arm rigidly connected to one end of the torsional bar assembly; a second arm pivotally connected to the same end of the torsional bar assembly adjacent to the first arm and connected at its other end to one end of at least one of the control arm connectors; and a key-and-slot arrangement for selectively rigidly connecting the second arm to the first arm. An actuator is attached to the scissors linkage for selectively engaging and disengaging the key-and-slot arrangement for selectively and rigidly connecting the second arm to the first arm of the scissors linkage, whereby the anti-sway bar may be selectively released by disengaging the scissors linkage and selectively engaged by engaging the scissors linkage.

These and other aspects of the present invention will become apparent to those skilled in the art after a reading of

DESCRIPTION OF THE PREFERRED EMBODIMENTS

Figure 1:
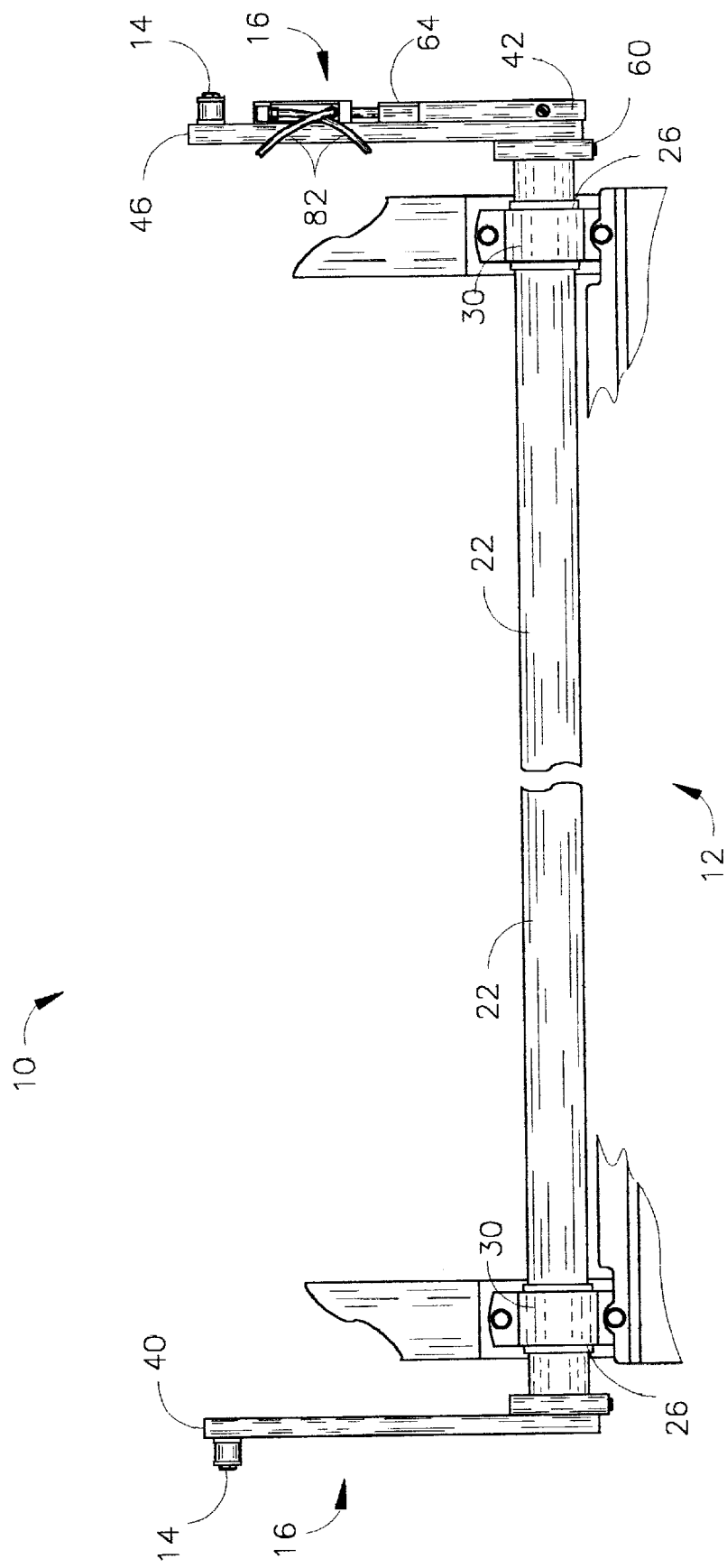
FIG. 1 is a top view a selectively releasable anti-sway bar constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a releasable anti-sway bar, generally designated 10, is shown constructed according to the present invention. The releasable anti-sway bar 10 includes three major sub-assemblies: a rigid moment arm 40; a torsional bar assembly 12; control arm connector 14; a releasable scissors linkage 16; and an linear actuator 20 for selectively engaging and disengaging the releasable scissors linkage.

The torsional bar assembly 12 includes a shaft 22, preferably fabricated from heat-treated spring steel having a $R_c$ value between about 20 and 25. The shaft 12 is mounted to the frame of a vehicle by mounting means 24. In the preferred embodiment of the invention, a "D"-shaped bushing 26 surrounds the shaft 12. The bushing 26 is an elastomeric material having a Shore A hardness value greater than about 7. The bushing 26 of the preferred embodiment is a single piece formed from injection molded polyurethane having a Shore A hardness between about 70 and 90. The elastomeric material preferably has a slit-cut to allow the shaft 22 to be inserted into the bushing 26. Clamps 30 are then used to attach the shaft to the vehicle frame using fasteners 32, such as steel bolts.

The releasable scissors linkage 16 is located at one end of the shaft 22. On the other end of shaft 22 a conventional rigid moment arm 40 is affixed, preferably by welding. The rigid moment arm 40 is in turn attached to an end of a control arm connector 14. The opposite end of the control arm assembly 14 is connected to the vehicle suspension system at a point adjacent to a wheel of the vehicle. When the releasable anti-sway bar assembly 10 is installed in a passenger vehicle, the moment arm 40 is preferably attached to the control arm connector 14 that is connected to the front wheel on the passenger's side of the vehicle.

The releasable scissors linkage 16 includes a first rigid mounting arm 42. A pivotally connected second arm 46 is pivotally attached to the shaft 22 adjacent to the first rigid mounting arm 42. A second control arm connector 14 is attached to the opposite end of the pivotally connected arm 46 distal to the pivotal connection between the pivotal second arm 46 and shaft 22. In the preferred embodiment, a compression collar 60 affixed to the shaft 22 serves to maintain the pivotal second arm 46 and the first rigid mounting arm 42 in contact with each other.

The control arm connectors 14 connect the moment arm 40—and thus the entire releasable anti-sway bar assembly 10—to the vehicle suspension at a point adjacent to one wheel of the vehicle. The other control arm connector 14 connects the pivotally connected arm 46—and thus the entire releasable anti-sway bar assembly 10—to the vehicle suspension at a point adjacent to the wheel on the opposite side of the vehicle. When installed in a passenger vehicle, the pivotal second arm 46 is preferably connected to the vehicle suspension at a point adjacent to the front wheel on the driver's side of the vehicle by another control arm connector 14. In the preferred embodiment, each control arm connected 14 includes a control arm shaft 34 having an eyelet 36 at each end. A bushing 38 located in one eyelet 36 affixes the control arm shaft 34 to the vehicle suspension, while a bushing 38 located in the eyelet 36 located at the opposite end of the control arm shaft 34 joins control arm connectors 14 to the pivotally connected second arm 46 and the moment arm 40, respectively. Bushings 38 are preferably fabricated from an elastomeric material.

Figure 2:
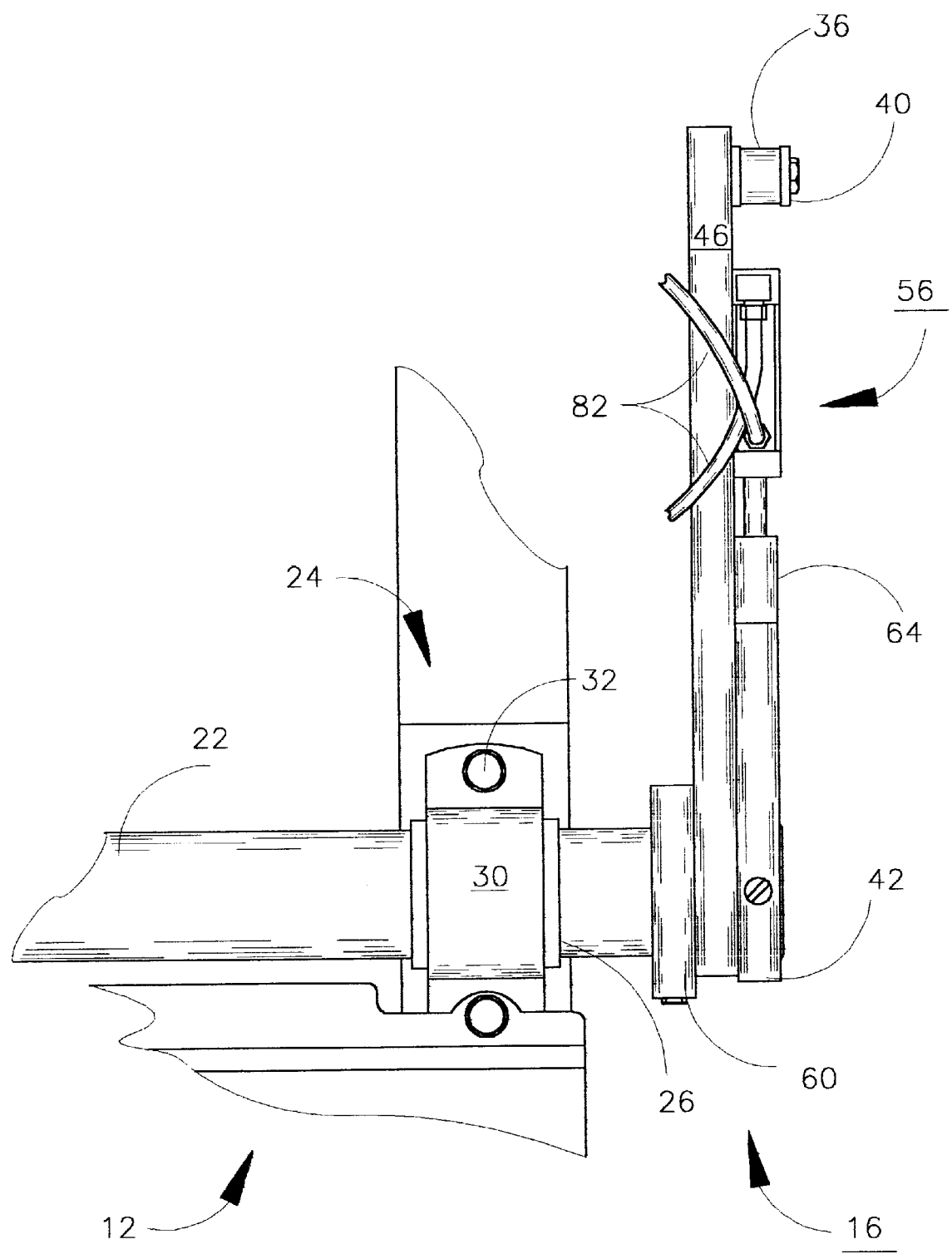
FIG. 2 is an enlarged view of FIG. 1, illustrating the releasable scissors linkage, preferably located on the driver's side of a vehicle.

An enlarged top view of the releasable scissors linkage 16, preferably located on the driver's side of the vehicle, is shown in FIG. 2. As discussed above, compression collar 60 affixed to shaft 22 serves to maintain the pivotal second arm 46 and the first rigid mounting arm 42 in contact with each other. A slot-and-key arrangement 56 for rigidly engaging the first rigid mounting arm 42 and the pivotal second arm 46 to each other.

Figure 3:
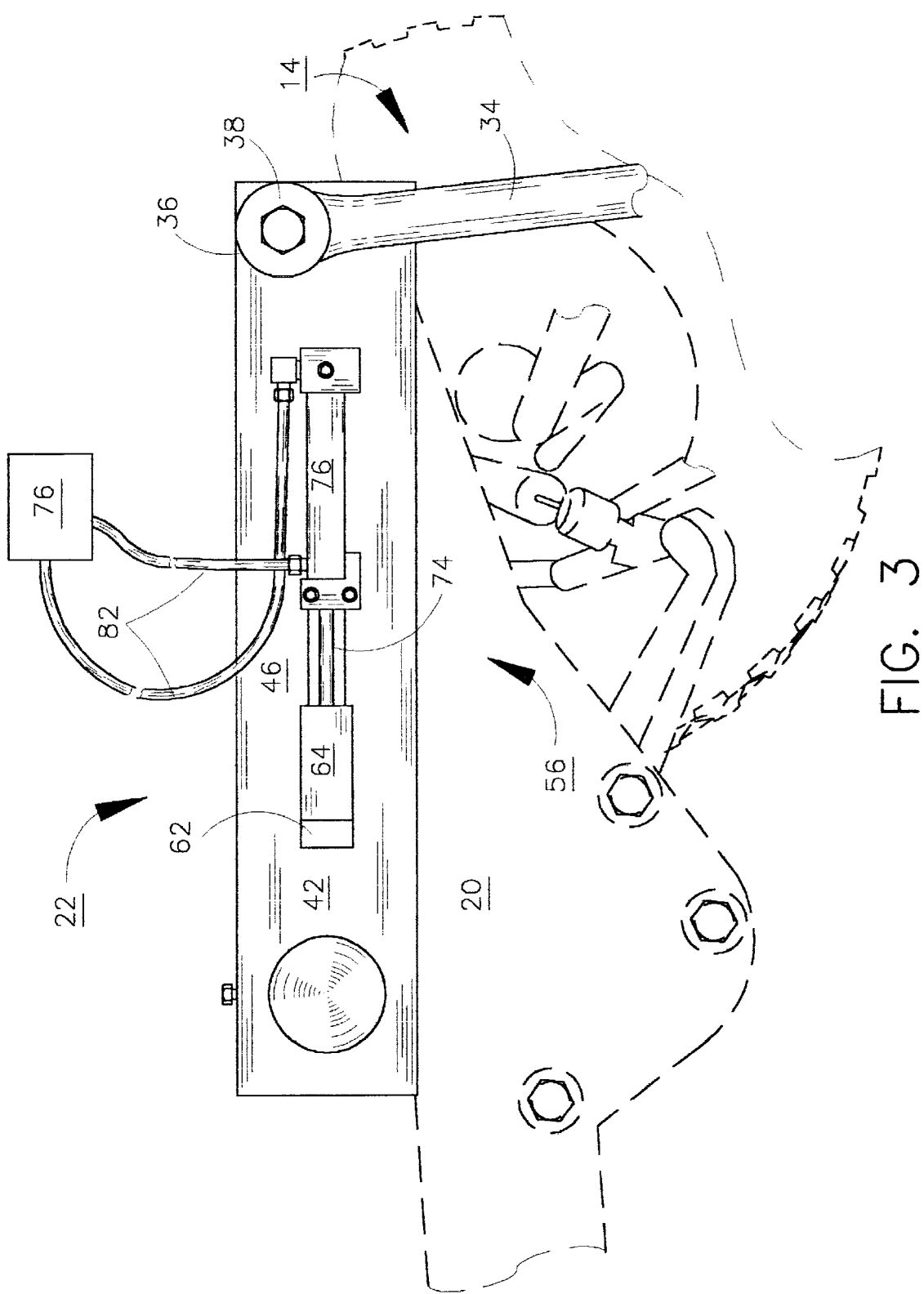
FIG. 3 is a side view of the present invention showing the releasable scissors linkage in its engaged position.

As best seen in FIG. 3, the pivotally connected second arm 46 and the first rigid mounting arm 42 are rigidly attached by the slot-and-key arrangement 56 for rigidly engaging the two arms to each other. The slot-and-key arrangement 56 includes a movable key 64 that engages a slot 62 located on the first rigid mounting arm 42. The movable key 64 is preferably connected to an actuator 20 that is mounted on the pivotal second arm 46 and axially aligned with a slot 62. The actuator 20 moves the movable key 64 to engage the slot 62, and the movable key 64 is biased toward the slot 62, creating a self-tightening fit.

In the preferred embodiment, the actuator 20 comprises a linear actuating means 74 that is driven by a fluid cylinder driven by a pressurized fluid supply 76, delivered by supply lines 82. The pressurized fluid supply provides a continuous locking pressure, preferably of about 50 psi, and an unlocking pressure preferably of about 150 psi. Although any hydraulic medium may be used to drive the linear actuating means 74, a pneumatically driven linear actuating means is preferred.

Figure 4:
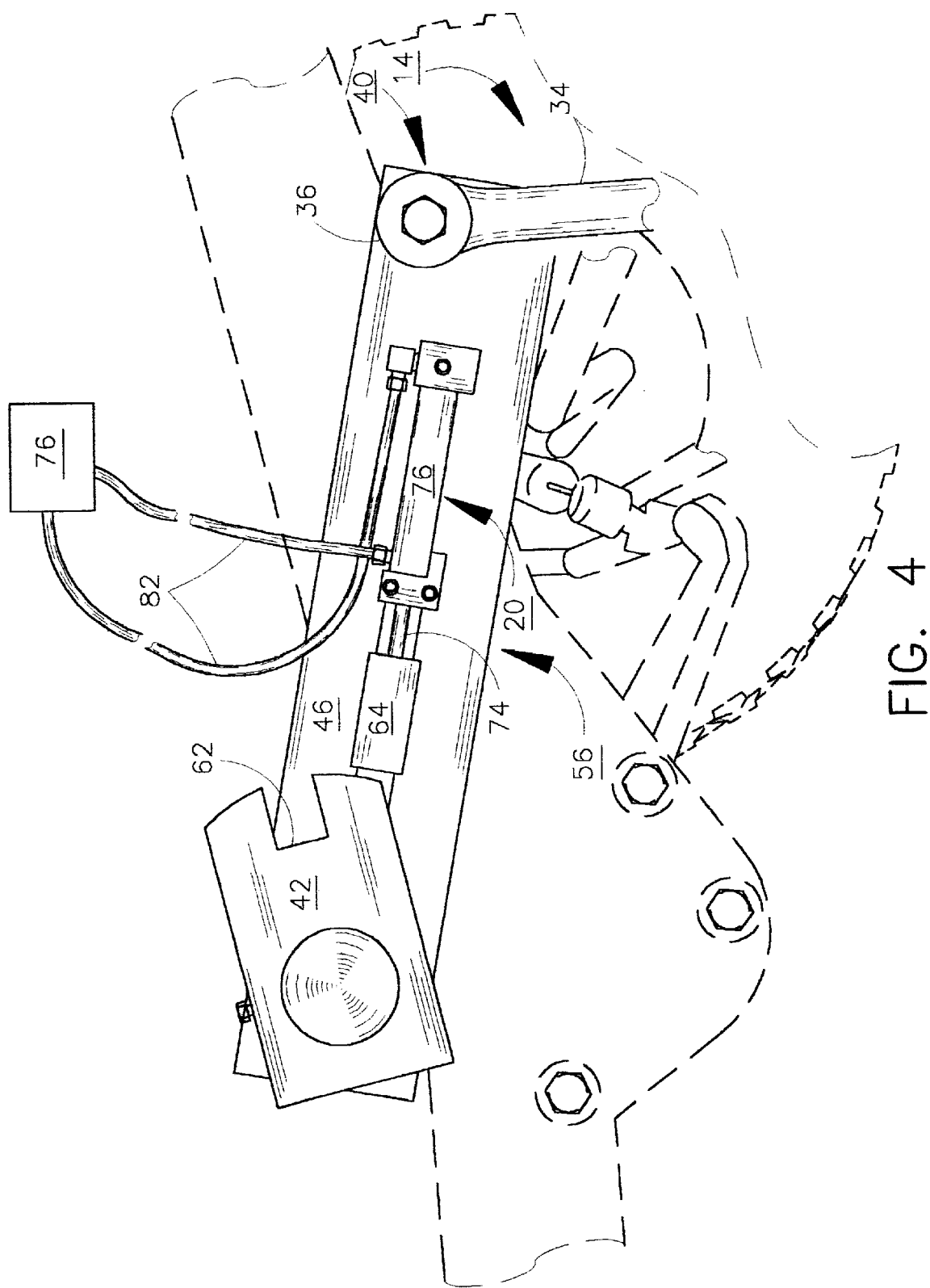
FIG. 4 is a side view of the present invention showing the releasable scissors assembly in its disengaged position.

FIG. 4 is a side view showing the slot-and-key arrangement 56 for rigidly connecting the first rigid mounting arm 42 and the pivotally connected second arm 46 in the disengaged position. The movable key 64 has been withdrawn by the actuating means 20 and thus disengaged from the slot 62, located in the first rigid mounting arm 42. The pivotally connected second arm 46 and the moment arm 40 are thus free to pivot around the shaft 22, and the shaft 22 is free to move up or down with respect to the frame of the vehicle.

In the preferred embodiment, the sides of the slot 62 are tapered about 3° inwardly toward the base of the slot 62, and the movable key 64 has a rectangular shape. The slot 62 has a depth that is greater than ¾ inch and is preferably 1 inch deep. Once the movable key 64 engages the slot 62, the pivotal second arm 46 and the rigid moment arm 40 are no longer able to pivot about the shaft 22. Consequently, the shaft 22 is then unable to move independent of the vehicle frame.

Figure 5:
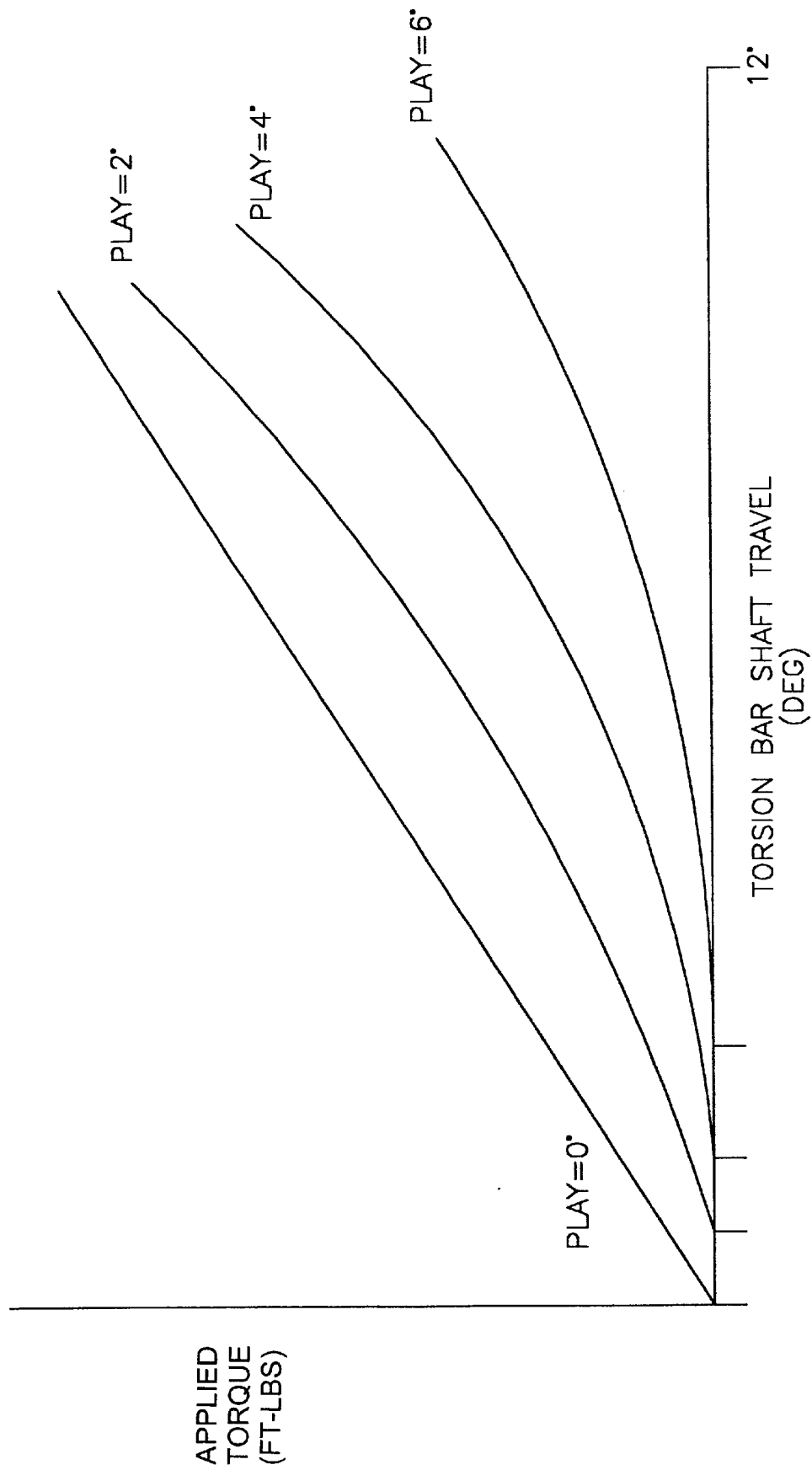
FIG. 5 is a graphical representation of the dependence of the angular deflection of the shaft of an anti-sway bar assembly on the torsional force applied to the anti-sway bar for differing amounts of play.
Figure 3:
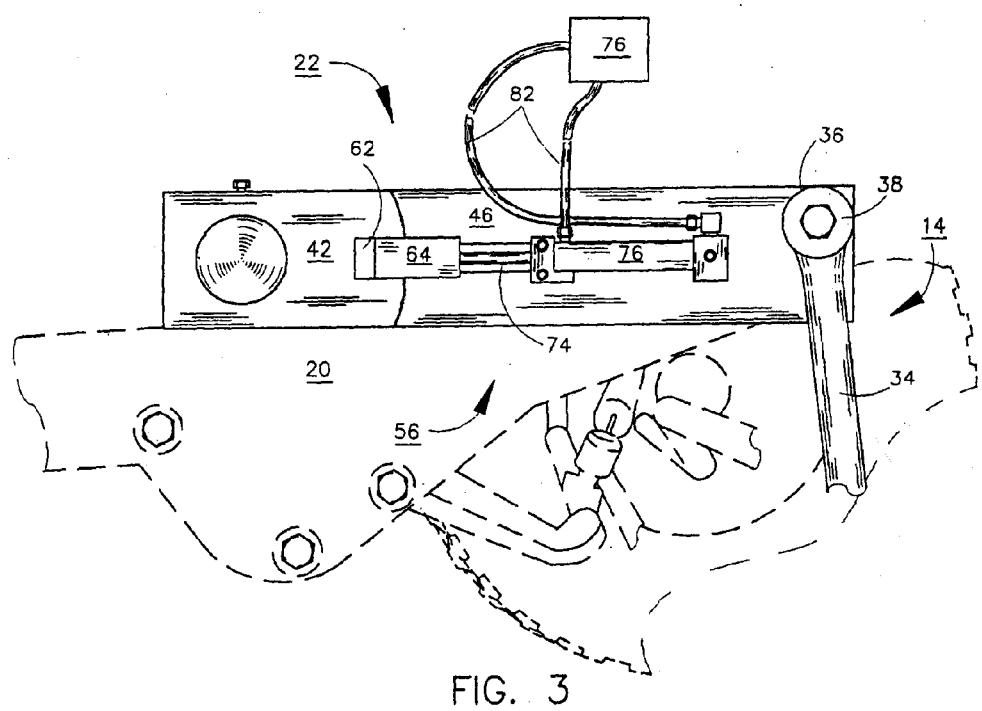

The slot 62 and key 64 used to rigidly engage the pivotal second arm 46 and the first rigid mounting arm 42 help ensure proper response of the releasable anti-sway bar assembly 10 to any torsional forces that may be applied to the shaft 22 and to minimize the amount of 'play' in the torsional bar assembly 12, releasable scissors linkage 16, and control arm assemblies 14. FIG. 5 is a graphical representation of the amount of torque applied to the shaft 22 plotted against the angle of deflection of the shaft 22. Ideally, the angle of deflection of the shaft 22 should vary linearly with respect to the amount of torque applied, as represented by the straight line passing through the origin in FIG. 5. If a certain degree of angular "play" B exists, the deflection of the shaft will deviate from the desired linear behavior until the shaft 22 and the entire releasable anti-sway bar assembly 10 becomes less responsive to any torsional forces that are applied. Such non-linear behavior may result in poor control of the vehicle.

FIG. 5 also shows the non-linear behavior of the angle of deflection A of the shaft with respect to applied torque when the "play" angle B in the anti-sway bar assembly 10 is 0, 4, and 6 degrees, respectively. In the preferred embodiment, the slot 62 and key 64, by rigidly engaging the pivotally connected mounting arm 46 and the first rigid mounting aim 42, minimize the play in the releasable anti-sway bar assembly 10 and thus maintain the stability of the vehicle substantially equal to a conventional, non-releasable anti-sway bar.

Certain modifications and improvements will occur to those skilled in the art upon a reading of the foregoing description. By way of example, the releasable scissors linkage 16 and locking key-and-slot arrangement 56 may be replaced with a ball and socket locking device. Also, the releasable scissors linkage 16 could be replaced with an indexing pin or plate that is actuated into the shaft 22. It should be understood that all such modifications and improvements have been deleted herein for the sake of conciseness and readability but are properly within the scope of the following claims.

I claim:

1. A selectively releasable anti-sway bar for a vehicle having a frame and at least one pair of opposed wheels attached to said frame by a spring-type suspension system, said apparatus comprising:
   (a) a torsional bar assembly;
   (b) control arm connectors attached to said suspension system adjacent to each of said opposed wheels;
   (c) a releasable scissors linkage between one end of said torsional bar assembly and one end of at least one of said control arm connectors, whereby said anti-sway bar may be selectively released by disengaging said scissors linkage and selectively engaged by engaging said scissors linkage; and
   (d) an actuator attached to said scissors linkage for selectively engaging and disengaging said scissors linkage.

2. The apparatus according to claim 1, wherein said actuator is a linear actuator.

3. The apparatus according to claim 2, wherein said linear actuator is a fluid cylinder.

4. The apparatus according to claim 3, wherein said cylinder is a bi-directional pneumatic cylinder.

5. The apparatus according to claim 3, further including a pressurized fluid supply.

6. The apparatus according to claim 5, wherein said pressurized fluid supply includes an air compressor and a supply line connected to said fluid cylinder.

7. The apparatus according to claim 5, wherein said pressurized fluid supply provides a locking pressure of about 50 psi.

8. The apparatus according to claim 5, wherein said pressurized fluid supply provides an unlocking pressure of about 150 psi.

9. The apparatus according to claim 1, wherein said torsional bar assembly includes an elongated shaft and means for mounting said shaft to said frame of said vehicle.

10. The apparatus according to claim 9, wherein said elongated shaft is formed from spring steel.

11. The apparatus according to claim 10, wherein said spring steel has a $R_c$ value of between about 22 and 25.

12. The apparatus according to claim 9, wherein said means for mounting said shaft to said frame of said vehicle includes a "D" bushing for receiving said shaft and a clamp and fasteners for attaching said "D" bushing and shaft to said frame.

13. The apparatus according to claim 12, wherein said "D" bushing is formed from an elastomeric material.

14. The apparatus according to claim 13, wherein said elastomeric material has a Shore A hardness of greater than about 70.

15. The apparatus according to claim 14, wherein said elastomeric material has a Shore A hardness of between about 70 and 90.

16. The apparatus according to claim 13, wherein said elastomeric material is a polyurethane.

17. The apparatus according to claim 16, wherein said elastomeric material is a one-component, injected molded polyurethane.

18. The apparatus according to claim 1, wherein said control arm connectors include an elongated shaft and eyelets attached to each end of said shaft for mounting said shaft to said suspension system adjacent to each of said opposed wheels.

19. The apparatus according to claim 18, wherein said eyelets include eyelet bushings formed from an elastomeric material.

20. The apparatus according to claim 18, further including a moment arm rigidly attached at one end to one end of said torsional bar assembly and connected at the other end to one of said control arm connectors attached to said suspension system adjacent to each of said opposed wheels.

21. A selectively releasable scissors linkage for an anti-sway bar for a vehicle having a frame and at least one pair of opposed wheels attached to the frame by a spring-type suspension system, said anti-sway bar including a torsional bar assembly, including a torsional bar shaft, and control arm connectors attached to said suspension system adjacent to each of said opposed wheels, said apparatus comprising:
   (a) a first arm rigidly connected to one end of said torsional bar shaft;
   (b) a second arm pivotally connected at a first end to the same end of said torsional bar shaft adjacent to said first arm and connected at a distal end to one end of at least one of said control arm connectors;
   (c) means for selectively rigidly connecting said second arm to said first arm, whereby said anti-sway bar may be selectively released by disengaging said scissors linkage and selectively engaged by said scissors linkage; and (d) an actuator attached to said scissors linkage for selectively engaging and disengaging said scissors linkage.

22. The apparatus according to claim 21, further including a compression collar attached to said torsional bar shaft on the side of said second arm opposite from said first arm for maintaining said second arm adjacent to said first arm.

23. The apparatus according to claim 22, wherein said means for selectively rigidly connecting said second arm to said first arm includes an elongated slot extending lengthwise along a portion of one of said arms and a movable elongated key extending lengthwise along a portion of the other of said arms, whereby engaging and disengaging said slot and said key is operable to selectively engaging and disengaging said anti-sway bar.

24. The apparatus according to claim 23, wherein said key is biased towards said slot and said slot is tapered outwardly, thereby forming a self-tightening fit between said key and said slot.

25. The apparatus according to claim 24, wherein said slot is tapered outwardly at greater than about 2 degrees.

26. The apparatus according to claim 25, wherein said slot is tapered outwardly at about 3 degrees.

27. The apparatus according to claim 24, wherein said slot has a depth of greater than about ¾ inches.

28. The apparatus according to claim 25, wherein said slot is about 1 inch deep.

29. A selectively releasable anti-sway bar for a vehicle having a frame and at least one pair of opposed wheels attached to said frame by a spring-type suspension system, said apparatus comprising:

(a) a torsional bar assembly, including a torsional bar shaft;

(b) control arm connectors attached to said suspension system adjacent to each of said opposed wheels;

(c) a releasable scissors linkage between one end of said torsional bar assembly and one end of at least one of said control arm connectors, said scissors linkage including: (i) a first arm rigidly connected to one end of said torsional bar shaft; (ii) a second arm pivotally connected at a first end to the same end of said torsional bar shaft adjacent to said first arm and connected at a distal end to one end of at least one of said control arm connectors; and (iii) means for selectively rigidly connecting said second arm to said first arm; and (d) an actuator attached to said-scissors linkage for selectively engaging and disengaging said means for selectively rigidly connecting said second arm to said first arm of said scissors linkage, whereby said anti-sway bar may be selectively released by disengaging said scissors linkage and selectively engaged by engaging said scissors linkage.

30. The apparatus according to claim 29, wherein said actuator is a linear actuator.

31. The apparatus according to claim 30, wherein said linear actuator is a fluid cylinder.

32. The apparatus according to claim 31, wherein said cylinder is a bi-directional pneumatic cylinder.

33. The apparatus according to claim 31, further including a pressurized fluid supply.

34. The apparatus according to claim 33, wherein said pressurized fluid supply includes an air compressor and a supply line connected to said fluid cylinder.

35. The apparatus according to claim 33, wherein said pressurized fluid supply provides a locking pressure of about 50 psi.

36. The apparatus according to claim 33, wherein said pressurized fluid supply provides an unlocking pressure of about 150 psi.

37. The apparatus according to claim 29, wherein said torsional bar assembly includes an elongated shaft and means for mounting said shaft to said frame of said vehicle.

38. The apparatus according to claim 37, wherein said elongated shaft is formed from spring a steel.

39. The apparatus according to claim 38, wherein said spring steel has a $R_c$ value of between about 22 and 25.

40. The apparatus according to claim 37, wherein said means for mounting said shaft to said frame of said vehicle includes a "D" bushing for receiving said shaft and a clamp and fasteners for attaching said "D" bushing and shaft to said frame.

41. The apparatus according to claim 40, wherein said "D" bushing is formed from an elastomeric material.

42. The apparatus according to claim 41, wherein said elastomeric material has a Shore A hardness of greater than about 70.

43. The apparatus according to claim 42, wherein said elastomeric material has a Shore A hardness of between about 70 and 90.

44. The apparatus according to claim 41, wherein said elastomeric material is a polyuirethane.

45. The apparatus according to claim 44, wherein said elastomeric material is a one-component, injected molded polyurethane.

46. The apparatus according to claim 29, wherein said control arm connectors include an elongated shaft and eyelets attached to each end of said shaft for mounting said shaft to said suspension system adjacent to each of said opposed wheels.

47. The apparatus according to claim 46, wherein said eyelets include eyelet bushings formed from an elastomeric material.

48. The apparatus according to claim 46, further including a moment arm rigidly attached at one end to one end of said torsional bar assembly and connected at the other end to one of said control arm connectors attached to said suspension system adjacent to each of said opposed wheels.

49. The apparatus according to claim 29, further including a compression collar attached to said torsional bar shaft on the side of said second arm opposite from said first arm for maintaining said second arm adjacent to said first arm.

50. The apparatus according to claim 49, wherein said means for selectively rigidly connecting said second arm to said first arm includes an elongated slot extending lengthwise along a portion of one of said arms and a movable elongated key extending lengthwise along a portion of the other of said arms, whereby engaging and disengaging said slot and said key is operable to selectively engaging and disengaging said anti-sway bar.

51. The apparatus according to claim 50, wherein said key is biased towards said slot and said slot is tapered outwardly, thereby forming a self-tightening fit between said key and said slot.

52. The apparatus according to claim 51, wherein said slot is tapered outwardly at greater than about 2 degrees.

53. The apparatus according to claim 52, wherein said slot is tapered outwardly at about 3 degrees.

54. The apparatus according to claim 51, wherein said slot has a depth of greater than about ¾ inches.

55. The apparatus according to claim 52, wherein said slot is about 1 inch deep.

* * * * *

UNITED STATES PATENT AND TRADEMARK OFFICE
CERTIFICATE OF CORRECTION

PATENT NO. : 6,345,831 B1
DATED : February 12, 2002
INVENTOR(S) : Edmond deMarcellus It is certified that error appears in the above-identified patent and that said Letters Patent is hereby corrected as shown below:

Drawings,
The Figure 3 attached replaces the Figure 3 with the patent.

Signed and Sealed this

Twenty-eighth Day of September, 2004

JON W. DUDAS
*Director of the United States Patent and Trademark Office*